United States Patent
Al-Garni et al.

(10) Patent No.: US 9,835,133 B2
(45) Date of Patent: Dec. 5, 2017

(54) ELECTRICAL POWER GENERATION SYSTEM USING RENEWABLE ENERGY

(71) Applicant: KING FAHD UNIVERSITY OF PETROLEUM AND MINERALS, Dhahran (SA)

(72) Inventors: Ahmed Z. Al-Garni, Dhahran (SA); Mohammed Aves, Hyderabad (IN)

(73) Assignee: King Fahd University of Petroleum and Minerals, Dhahran (SA)

( * ) Notice: Subject to any disclaimer, the term of this patent is extended or adjusted under 35 U.S.C. 154(b) by 490 days.

(21) Appl. No.: 14/631,765

(22) Filed: Feb. 25, 2015

(65) Prior Publication Data

US 2015/0167636 A1    Jun. 18, 2015

Related U.S. Application Data

(63) Continuation-in-part of application No. 13/974,010, filed on Aug. 22, 2013, now abandoned.

(51) Int. Cl.
| | | |
|---|---|---|
| H02J 1/00 | (2006.01) | |
| H02J 3/00 | (2006.01) | |
| F03D 3/04 | (2006.01) | |
| F03D 3/00 | (2006.01) | |
| H02J 4/00 | (2006.01) | |

(Continued)

(52) U.S. Cl.
CPC ............ F03D 3/0427 (2013.01); F03D 3/005 (2013.01); F03D 3/0418 (2013.01); F03D 9/007 (2013.01);

(Continued)

(58) Field of Classification Search
CPC ...... F03D 3/005; F03D 3/0418; F03D 3/0427; F03D 9/007; H02J 4/00; H02S 10/12;
(Continued)

(56) References Cited

U.S. PATENT DOCUMENTS 3,944,840 A * 3/1976 Troll .................... F03D 1/04
290/55
4,200,904 A    4/1980 Doan
(Continued)

FOREIGN PATENT DOCUMENTS

| JP | 2003-42052 | 2/2003 |
|---|---|---|
| JP | 2011-219966 | 11/2011 |

*Primary Examiner* — Rexford Barnie
*Assistant Examiner* — Toan Vu
(74) *Attorney, Agent, or Firm* — Oblon, McClelland, Maier & Neustadt, L.L.P.

(57) ABSTRACT

The electrical power generation system using renewable energy is particularly adapted to provide electrical power to an independent or remotely situated electrical device such as a street light, emergency call box, or illuminated road sign. The system includes a pivotally mounted venturi with vanes assuring that the venturi is oriented into the prevailing wind. A vertical axis wind turbine is installed in the venturi throat, and drives a shaft extending through the column upon which the venturi is installed to a generator at the base of the column. The venturi and vanes may include photovoltaic cells thereon for further electrical power. The venturi may be heated from a geothermal source, and may include a variable diameter internal wall to adjust the cross-sectional area of the throat of the venturi. The use of functionally graded materials and other phase change materials may also improve the performance of the device.

10 Claims, 2 Drawing Sheets

(51) Int. Cl.
*F03D 9/00* (2016.01)
*H02S 10/12* (2014.01)

(52) U.S. Cl.
CPC .............. *H02J 4/00* (2013.01); *H02S 10/12* (2014.12); *F05B 2220/708* (2013.01); *F05B 2240/12* (2013.01); *F05B 2240/133* (2013.01); *Y02E 10/74* (2013.01); *Y10T 307/658* (2015.04)

(58) Field of Classification Search
CPC ............ F05B 2220/708; F05B 2240/12; F05B 2240/133; Y02E 10/74; Y10T 307/658
USPC .......................................................... 307/72
See application file for complete search history.

(56) References Cited

U.S. PATENT DOCUMENTS

| | | | |
|---|---|---|---|
| 6,660,667 B2 * | 12/2003 | Zuckerman | D04H 11/00 428/402 |
| 6,955,215 B2 | 10/2005 | Al-Garni et al. | |
| 7,045,702 B2 * | 5/2006 | Kashyap | F03D 9/007 136/244 |
| 8,043,499 B2 | 10/2011 | Saeed et al. | |
| 8,083,902 B2 | 12/2011 | Al-Garni et al. | |
| 8,207,625 B1 | 6/2012 | Cristo | |
| 8,282,236 B2 | 10/2012 | Pelken et al. | |
| 8,360,713 B2 | 1/2013 | Carosi et al. | |
| 8,875,511 B2 * | 11/2014 | Simpson | F24J 3/08 290/44 |
| 2009/0262525 A1 | 10/2009 | Lai | |
| 2010/0220467 A1 | 9/2010 | Daidone et al. | |
| 2010/0295319 A1 | 11/2010 | Britnell | |
| 2011/0198855 A1 * | 8/2011 | White | F03D 1/04 290/55 |
| 2012/0003077 A1 | 1/2012 | Churchill | |
| 2012/0097217 A1 * | 4/2012 | Yin | H02S 40/44 136/248 |
| 2012/0302228 A1 | 11/2012 | Gray | |

* cited by examiner

ELECTRICAL POWER GENERATION SYSTEM USING RENEWABLE ENERGY

REFERENCE TO RELATED APPLICATION

This application is a continuation-in-part of U.S. patent application Ser. No. 13/974,010 filed on Aug. 22, 2013.

BACKGROUND OF THE INVENTION

1. Field of the Invention

The present invention relates generally to the generation and production of electrical power, and particularly to an electrical power generation system using renewable energy including wind, solar, and/or geothermal energy sources.

2. Description of the Related Art

The development of various electrical appliances and devices has led to their widespread installation and use in virtually all developed areas of the world. Electric lighting for street lights and the like is nearly universal in urban and suburban areas throughout the world, and provision for other electrically powered devices (e.g., emergency call boxes, etc.) is also well known.

However, such devices typically require electrical power. The basic installation of an electric street light or emergency call box is generally not difficult or expensive, but the provision of electrical power for such devices can be quite costly and time consuming as trenches are dug for buried electrical cables or poles are placed for overhead electrical wiring. In many instances such electrical lighting and other devices can be relatively widely spaced apart, with only a few individual street lighting units being placed in perhaps a mile of roadway, and perhaps only a single emergency call box being placed in a similar distance. Thus, the installation of electrical power cables and the like for such electrically powered devices can often cost considerably more than the electrical devices themselves. The same can hold true for electrical installations in other remote areas such as campsites, etc.

Accordingly, some efforts have been made in the past to generate the required electrical energy at the site or location of the individual electrical devices. An example of such is found in Japanese Patent Publication No. 2003-42052 published on Feb. 13, 2002 to Matsushita Seiko KK. This reference describes a street light or the like that is powered by a vertical axis wind turbine and/or a plurality of photovoltaic panels disposed immediately beneath the wind turbine. The panels are sloped to more effectively face the sun, with the slopes of the panels being utilized to deflect airflow toward the wind turbine as the wind blows across the panels.

Another example is found in Japanese Patent Publication No. 2011-219966 published on Nov. 4, 2011 to Tec One. This reference describes an illuminated guidance sign having a vertical axis wind turbine within a housing and a plurality of photovoltaic panels atop the housing. The guidance sign, wind turbine, photovoltaic panels, generator, and electrical storage battery are all contained with or immediately adjacent the housing.

Thus, an electrical power generation system using renewable energy addressing the aforementioned problems is desired.

SUMMARY OF THE INVENTION

Embodiments of an electrical power generation system using renewable energy are adapted particularly for providing electrical energy on site for an independently or remotely situated electrical device, e.g., a street or highway light, emergency call box, electrically powered information or warning sign, etc. The system includes a pivotally mounted, horizontally disposed venturi having a vertical axis wind turbine installed within the throat thereof. The venturi includes one or more vanes to orient the venturi into the prevailing wind. The body of the venturi and/or the vanes may include photovoltaic cells or panels thereon to provide additional electrical energy to the associated electrical device.

The venturi may further include a variable diameter inner wall formed of a phase change material to provide a variable cross-sectional area for the throat of the venturi. A series of adjustable struts may be provided between the fixed outer wall and the adjustable inner wall of the venturi, to adjust the throat diameter as required. The venturi may further include functionally graded material to adjust the insulation value of the venturi wall according to a predetermined temperature(s).

Heat may be provided to the venturi from a subterranean geothermal source. Heating the venturi can result in an increase in air velocity through the venturi throat due to the expansion of the air therein as it is heated, and the heated air can increase the speed of the turbine as can increase the electrical power generated. Such heat can also serve to reduce or substantially preclude the chance of ice formation in and around the venturi and, thus, can assist in providing operation in freezing conditions.

Rotational energy is transmitted from the vertical axis wind turbine via a mechanical shaft extending down the pole or column upon which the venturi is mounted, to a generator, such as located at the bottom of the column. The generator charges an electrical storage battery or batteries to provide electrical energy to the associated electrical device, such as when electrical power cannot be provided by the wind turbine or photovoltaic cells.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
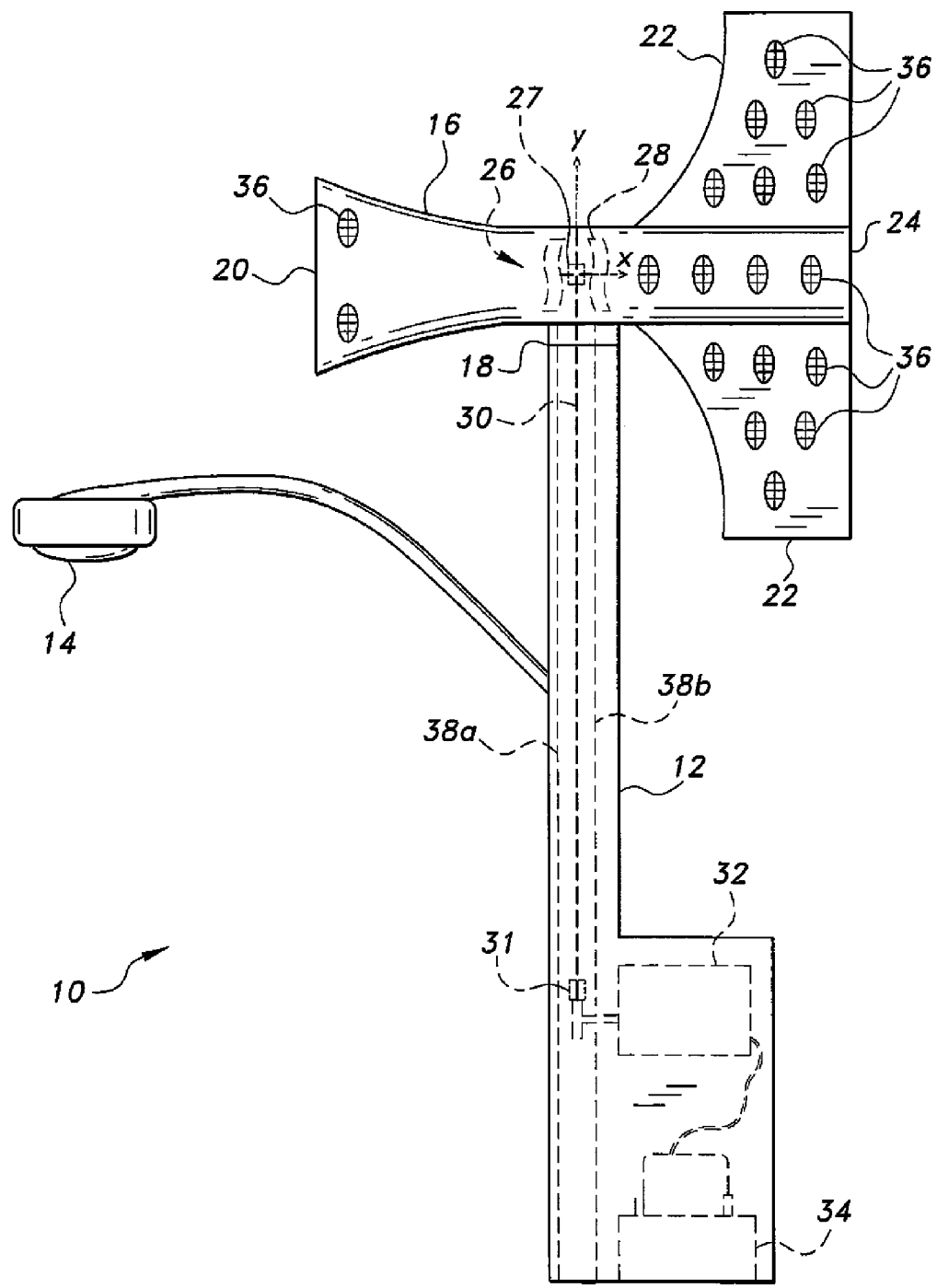
FIG. 1 is a schematic view of an electrical power generation system using renewable energy according to the present invention, illustrating its general features.
Figure 2:
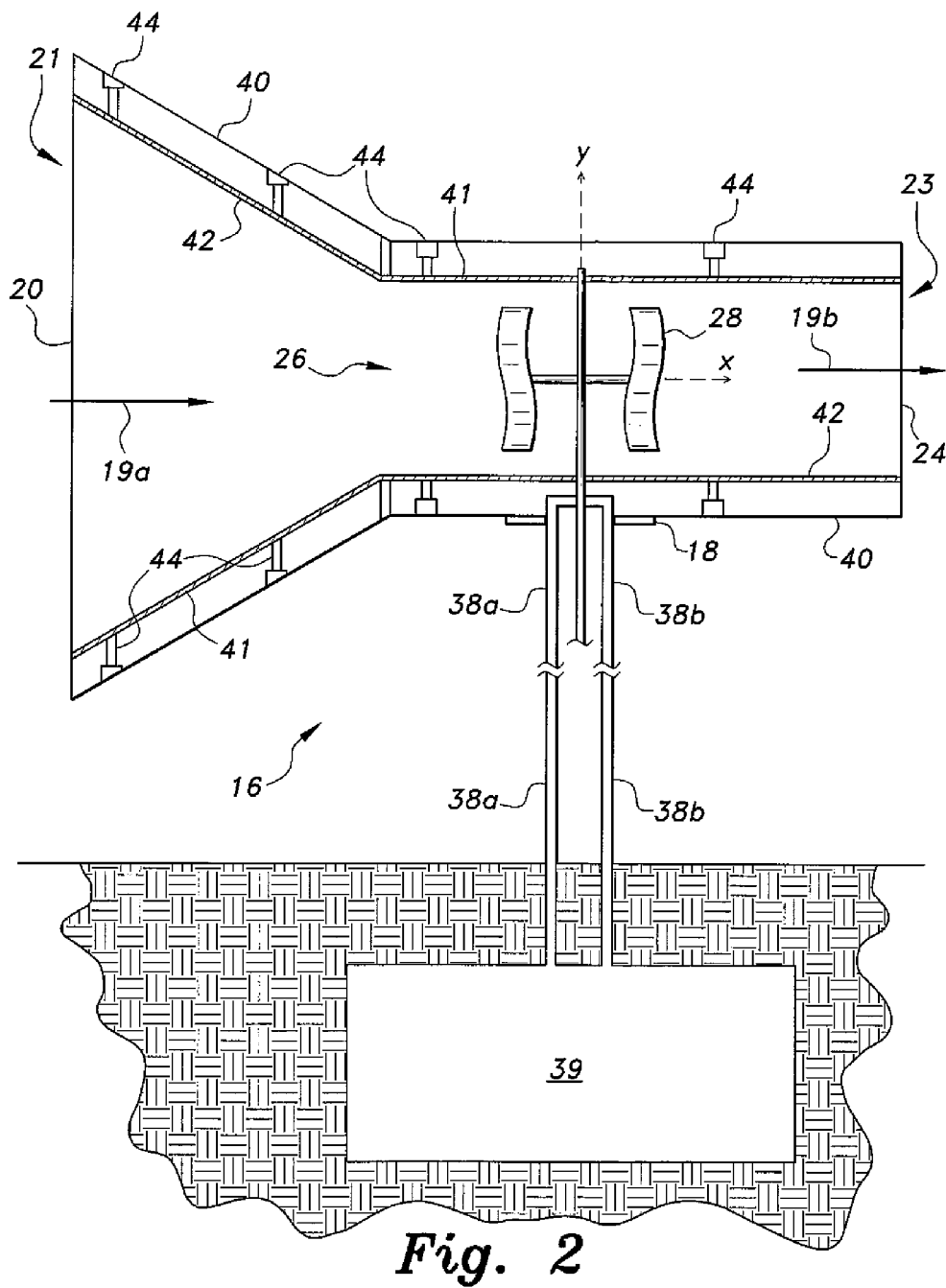
FIG. 2 is a side elevation view in section of the venturi of the electrical power generation system using renewable energy according to the present invention, illustrating further details thereof.

Embodiments of an electrical power generation system using renewable energy can provide electrical power for an independent or remotely located device, such as a street light, traffic information sign, emergency call box, lighting for a campground, and/or other similar installations, such as where the delivery of electrical power from a centralized power station can be impractical or unavailable. FIG. 1 provides a schematic side elevation view of an embodiment of an exemplary installation of the electrical power generation system 10, illustrating its basic components. The electrical power generation system 10 is adapted for installation on a pole 12 supporting a street light 14 or other electrical device or appliance, for example. A venturi 16 is mounted atop the pole 12 on a pivot or swivel mount 18, enabling the venturi 16 to swivel atop the pole 12, such as about a vertical axis Y, in accordance with changes in wind direction, such that an inlet 20 of the venturi 16 can be aligned into the wind. One or more wind vanes 22 can extend from the rearward portion 24 of the venturi 16, to align the venturi 16 with the wind. As illustrated in FIGS. 1 and 2, the air enters the venturi 16 through the inlet 20 in an inward direction indicated generally by the arrow 19a, such as through one or more apertures or openings 21, flows through the throat 26 of the venturi 16 and exits the venturi 16 through the rear portion 24 in an outward direction indicated generally by the arrow 19b, such as through one or more apertures or outward air passages 23 in the rear portion 24.

The venturi 16 includes the central throat portion 26 having a narrower diameter than a diameter of the inlet portion 20. A wind turbine 28 is installed in the throat 26, to take advantage of the greater velocity of air flowing through the narrower throat 26 of the venturi 16. The wind turbine 28 is affixed, such as by being mechanically linked by a mechanical linkage 27 (e.g., conventional gearing, etc.), to a vertical shaft 30 to rotate about an axis, such as the vertical axis Y, with the shaft 30 rotating with the wind turbine 28, such as by the mechanical linkage 27. In this configuration, it will be see that the rotational axis of the wind turbine 28 is perpendicular to the axis of the venturi 16. The wind turbine 28 can also be affixed to the vertical shaft 30, such as by being mechanically linked by the mechanical linkage 27 (e.g., conventional gearing, etc.), to rotate about an axis X, such as a horizontal axis, with the shaft 30 rotating with the wind turbine 28, such as by the mechanical linkage 27. The shaft 30 extends down the pole or column 12 and is mechanically linked, such as by a mechanical linkage 31 (e.g., conventional gearing, etc.) to a generator, alternator, or dynamo 32 at the base of the pole or column 12 to transfer the rotational power from the shaft 30 to the generator, alternator, or dynamo 32. The generator, alternator, or dynamo 32 in turn generates and supplies electrical current to an electrical storage device 34, such as electrical storage battery or batteries 34, to supply electrical energy to the light 14, or other electrically powered device, such as when the wind turbine 28 is not in operation.

The electrical power generation system 10 can provide additional electrical energy when sufficient light is available, by means of a plurality of photovoltaic cells 36 disposed upon the body of the venturi 16 and upon the wind vanes 22 thereof. The photovoltaic cells 36 may be connected to the electrical storage battery 34 by conventional wiring (not shown).

Heat energy can also be provided to the venturi 16, such as by means of a geothermal supply line 38a and return line 38b that connect conventionally to a subterranean source of heat 39, for example, such as to provide and circulate the heat through the venturi 16, such as between an outer wall 40 and an inner wall 42 of the venturi 16, as illustrated in FIG. 2, such as by conduction or convection, for example, to provide the heat to the air flowing in the venturi 16.

The venturi 16 is free to pivot or rotate to face the prevailing wind, in accordance with the vanes 22 at the trailing end 24 of the venturi 16. The upper ends of the two pipes 38a, 38b connect to one another at the top of the stationary pole 12, as shown more clearly in FIG. 2, with heat convecting from this stationary portion of the pipes to the rotating venturi 16 above. The stationary portion of the pipe is formed of a phase change material (PCM). Its inner surface absorbs the geothermal heat from the fluid circulating inside the supply lines 38a and 38b and transfers it to the fluid circulating between the inner and outer surfaces 42 and 40 of the venturi 16. The venturi 16 is affixed to the rotating mechanism 18 as shown in FIG. 2.

The addition of heat to the air flowing through the venturi 16 can serve to increase air velocity through the venturi throat 26 due to the expansion of the air in the venturi throat 26 as it is heated. The heated air can increase the speed of rotation, or the rotational speed, of the wind turbine 28 as can increase the electrical power generated, such as by increasing rotation of the shaft 30, by enhancing an increase in the velocity of the airflow, or the air flowing, in the venturi throat 26 over the case with air in the venturi throat 26 at ambient temperature. Further, the heat provided by the geothermal supply lines 38a and 38b can serve to reduce or substantially prevent the accumulation of ice in the electrical power generation system 10 during freezing conditions, thereby assisting the wind turbine 28 to continue to operate in such freezing conditions. The supply lines 38a, 38b may be formed of high density polyethylene (HDPE) plastic, or other suitable material as desired. The working fluid is preferably water mixed with a suitable percentage of glycol or other agent to lower the freezing temperature of the mixture. A heat exchanger, preferably made from HDPE, can be used for heat exchange. It should be noted that there is no mixing or dispersal of the geothermal working fluid into the venturi 16.

FIG. 2 provides a more detailed schematic elevation view in section of the venturi 16. It will be seen that the venturi 16 includes the outer wall 40, as can be substantially rigid or rigid, and also includes the inner wall 42, as can be flexible or substantially flexible, or rigid or substantially rigid, depending upon the particular use or application, for example. The inner wall 42 may be formed of or have thereon a phase change material (PCM) 41 to control the amount of heat contained within and escaping through the walls 40 and 42 of the venturi 16. For the heat transfer to the air flowing through the venturi 16, one or more types of phase change material (PCM) 41 can be used for or on the inner surface of the inner wall 42 of the venturi 16, such as depending on whether the area formed by the inner wall 42 is to be a variable area. For example, where the area formed by the inner wall 42 of the venturi 16 is not substantially variable, a pretreated PCM, such as a hybrid Functionally Graded Material (FGM), which can respond to a certain trigger temperature can be used as the PCM FGM material 41. The PCM FGM material 41 can be adapted for varying the thermal insulation properties thereof according to variations in ambient temperature, for example.

Using such PCM FGM material 41, such as including a suitable metal layer and ceramic layer, for example, when the trigger temperature is reached, the PCM FGM material 41 "remembers" its initial composition, such as forcing migration of carbides from the mostly metal layer towards the ceramic layer. This can result in a change in the distribution of the different thermal insulating materials, with a change in the thermal insulation capabilities of the material 41 on the inner wall 42. To reverse the process a lower trigger temperature can be selected, for example, for the PCM FGM material 41.

Also, embodiments can include a PCM FGM material 41 that enables the flow of thermal energy therethrough. The venturi 16, such as the inner wall 42, can be desirably constructed with, or have disposed thereon, such PCM FGM material 41, such as oriented to allow heat to pass from the outer, ambient air into the interior of the venturi 16 when the ambient air is warmer than the interior of the venturi 16 in order to enhance the heating of the air flowing through the venturi 16. However, such PCM FGM material 41 can substantially block heat transfer in the opposite direction, i.e., from the interior of the venturi 16 to the ambient air, when the temperature within the venturi 16 is warmer than the ambient air external to the venturi 16. In this manner, the temperature within the venturi 16 can remain elevated to maximize the effect of the heated air to enhance increasing the velocity of the airflow in the venturi throat 16. An example of such PCM FGM material 41 is a material typically formed of a metal and ceramic laminate, and has a predetermined "trigger temperature" causing the migration of carbides from the metal layer toward the ceramic layer to alter the thermal conductivity of the material. Such types of functionally graded material are conventional and known in the art.

Embodiments of the electrical power generation system 10 can also include an inner wall 42 formed of a flexible or substantially flexible material as the material 41 to facilitate adjustment of the inner area of the venturi 16 as a temperature controlled variable inner area of the venturi 16. The inner area of the venturi 16 can be varied, such as to control or adjust the velocity of the air flowing through the venturi 16, depending on type or amount of flow of the air, such as by using struts 44. The struts 44 can selectively adjust the diameter of the inner wall 42 to provide a diametrically adjustable inner wall 42, such as to adjust the velocity of air flowing through the throat 26 of the venturi 16, for example, to selectively increase, maintain or decrease the electrical power generated by rotation of the wind turbine 28 by adjusting the rotational speed of the wind turbine 28, for example. Where the inner area of the venturi 16 is varied, the flexible material as the material 41 can include another type of PCM material that includes a flexible fabric substrate coated with microspheres, with the microspheres containing a PCM of paraffinic hydrocarbons, a surfactant, a dispersant, an anti-foam agent, and a thickener. Such flexible PCM material 41 can also be adapted for varying the thermal insulation properties thereof according to variations in ambient temperature, for example. Also, such flexible PCM material 41, as part of or in conjunction with a substantially flexible inner wall 42, can permit the internal diameter and, thus, the inner area of the venturi 16 to be adjusted, such as by means of the typically relatively small actuator struts 44 disposed between the substantially rigid outer wall 40 and the inner wall 42. In this regard, the flexible fabric PCM material 41 can form the inner wall 42 or can be located on or can be a part of the inner wall 42, and the struts 44 can selectively adjust the diameter of the inner wall 42, for example. The struts 44 can be conventionally operated, e.g., electrical screw jacks or solenoids, hydraulic or pneumatic operation, thermal operation, etc.

Also, a hybrid Functionally Graded Material (FGM) adapted for varying the thermal insulation properties thereof according to variations in ambient temperature, which can respond to a certain trigger temperature, as discussed, can be used as the PCM FGM material 41 on or for all or part of the inner wall 42 when the venturi 16 includes and uses the struts 44 to selectively adjust the diameter of the inner wall 42, for example. In the example illustrated in FIG. 2, it will be seen that the struts 44 and flexible PCM or FGM material 41 are distributed substantially entirely about the entire structure of the venturi 16.

It is to be understood that the present invention is not limited to the embodiments described above, but encompasses any and all embodiments within the scope of the following claims.

We claim:

1. An electrical power generation system using renewable energy, comprising:
   a venturi having an inner wall, an outer wall spaced from the inner wall, an inlet, and a throat, the throat having a smaller diameter than a diameter of the inlet, wherein the outer wall of the venturi is substantially rigid, the inner wall of the venturi is substantially flexible and diametrically adjustable, and the outer wall and the inner wall extend completely about the entire venturi;
   a vertical axis wind turbine disposed entirely within the smaller diameter throat of the venturi to generate electrical power by rotation of the wind turbine by air flowing through the throat of the venturi; and
   geothermal heating means communicating with the outer wall of the venturi to convectively heat the air flowing through the venturi to increase the velocity of the air flowing through the throat of the venturi to increase the rotational speed of the wind turbine to increase the electrical power generated by rotation of the wind turbine.

2. The electrical power generation system using renewable energy according to claim 1, wherein the flexible, diametrically adjustable inner wall of the venturi further comprises a phase change material (PCM) including a fabric substrate coated with microspheres, the microspheres including paraffinic hydrocarbons, a surfactant, a dispersant, an anti-foam agent, and a thickener.

3. The electrical power generation system using renewable energy according to claim 1, further including a plurality of adjustable struts disposed between the outer wall and the inner wall of the venturi substantially throughout the entirety thereof, the adjustable struts selectively adjusting the diameter of the entire inner wall of the venturi.

4. The electrical power generation system using renewable energy according to claim 1, further comprising:
   a functionally graded material (FGM) disposed within the venturi, the functionally graded material being adapted to vary the thermal insulation properties thereof according to variations in ambient temperature.

5. The electrical power generation system using renewable energy according to claim 1, further comprising:
   at least one wind vane extending from a rearward portion of the venturi; and
   a plurality of photovoltaic cells disposed upon the venturi and the at least one wind vane to additionally generate electrical power.

6. The electrical power generation system using renewable energy according to claim 1, further comprising;
   a plurality of photovoltaic cells disposed upon the venturi to additionally generate electrical power.

7. An electrical power generation system using renewable energy, comprising:
   a venturi having an outer wall, an inlet, and a throat, the throat having a smaller diameter than a diameter of the inlet, wherein the venturi has a substantially rigid outer wall and a substantially flexible, diametrically adjustable inner wall;
   a plurality of adjustable struts disposed between the outer wall and the inner wall of the venturi substantially throughout the entirety thereof, the adjustable struts selectively adjusting the diameter of the entire inner wall;
   a vertical axis wind turbine disposed entirely within the throat of the venturi; and
   a phase change material (PCM) disposed within the venturi, the PCM being adapted for varying the thermal insulation properties thereof according to variations in ambient temperature to adjust the rotational speed of the vertical axis wind turbine to increase electrical power generated by rotation of the wind turbine.

8. The electrical power generation system using renewable energy according to claim 7, further comprising:
geothermal heating means communicating with the outer wall of the venturi to convectively heat the air flowing through the venturi to increase the velocity of the air flowing through the throat of the venturi to increase the rotational speed of the vertical axis wind turbine to increase the electrical power generated by rotation of the wind turbine.

9. The electrical power generation system using renewable energy according to claim 7, wherein the flexible, diametrically adjustable inner wall of the venturi further comprises the PCM, the PCM including a fabric substrate coated with microspheres, the microspheres including paraffinic hydrocarbons, a surfactant, a dispersant, an anti-foam agent, and a thickener.

10. The electrical power generation system using renewable energy according to claim 7, further comprising:
at least one wind vane extending from a rearward portion of the venturi; and
a plurality of photovoltaic cells disposed upon the venturi and the at least one wind vane to additionally generate electrical power.

* * * * *